United States Patent
Dudek et al.

(10) Patent No.: US 10,326,561 B2
(45) Date of Patent: Jun. 18, 2019

(54) MIRROR-RING ASSEMBLY FOR BI-DIRECTIONAL OPTICAL COMMUNICATION BETWEEN A ROTOR AND A STATOR

(71) Applicant: Toshiba Medical Systems Corporation, Otawara-shi (JP)

(72) Inventors: Marek Dudek, Lake Villa, IL (US); Ognian Ivanov, Lake Zurich, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 14/748,951

(22) Filed: Jun. 24, 2015

(65) Prior Publication Data
US 2016/0380728 A1    Dec. 29, 2016

(51) Int. Cl.
*H04B 10/11* (2013.01)
*H04L 1/18* (2006.01)
(Continued)

(52) U.S. Cl.
CPC .......... *H04L 1/1867* (2013.01); *G01T 1/2985* (2013.01); *G01T 7/00* (2013.01);
(Continued)

(58) Field of Classification Search
CPC ..... H04L 1/1867; H04L 1/004; H04L 1/1809; H04L 1/1806; H04L 1/1803; H04L 1/16;
(Continued)

(56) References Cited

U.S. PATENT DOCUMENTS 4,259,584 A    3/1981 Krumme
4,525,025 A *  6/1985 Hohmann ............ G02B 6/3604
                                                      385/26

(Continued)

OTHER PUBLICATIONS

VM Shapar "Small-sized multichannel optical rotary joint for optical sensors based on rotating objects" http://een.just.ac.ir/profs/sadr/Papers/fbr2.6.pdf

*Primary Examiner* — Kenneth N Vanderpuye
*Assistant Examiner* — Dibson J Sanchez
(74) *Attorney, Agent, or Firm* — Oblon, McClelland, Maier & Neustadt, L.L.P.

(57) ABSTRACT

An optical rotary joint communication apparatus for communicating between a rotor and a stator. Optical sources and detectors are arranged on both the rotor and the stator to provide bi-directional communication. As the rotor rotates, downlink detectors on the rotor sequentially communicate via line-of-sight optical channels with corresponding downlink receivers on the stator. Each downlink receiver is provided a curved mirror reflecting the downlink beam onto the downlink receiver when the rotation angle of the rotor is within a corresponding angle interval. When the rotation angle moves past the angle interval, the downlink beams transition to another mirror and another downlink receiver. The downlink beams are directed predominantly tangential to the rotor circumference. Adjacent downlink transmitters transmit redundant data, and transitions between downlink receivers are staggered for adjacent downlink transmitters to occur at non-overlapping rotation angles in order to prevent loss of data during transitions.

20 Claims, 9 Drawing Sheets

(51) Int. Cl.
*H02K 1/22* (2006.01)
*H02K 1/12* (2006.01)
*G02B 17/00* (2006.01)
*G01T 7/00* (2006.01)
*G01T 1/29* (2006.01)
*H01R 39/00* (2006.01)
*H02K 11/00* (2016.01)
*H02K 11/20* (2016.01)
*H04L 1/16* (2006.01)
*H04L 1/00* (2006.01)

(52) U.S. Cl.
CPC .......... *G02B 17/002* (2013.01); *H01R 39/00* (2013.01); *H02K 1/12* (2013.01); *H02K 1/22* (2013.01); *H02K 11/0094* (2013.01); *H02K 11/20* (2016.01); *H04B 10/11* (2013.01); *H04L 1/004* (2013.01); *H04L 1/16* (2013.01); *H04L 1/1803* (2013.01); *H04L 1/1806* (2013.01); *H04L 1/1809* (2013.01)

(58) Field of Classification Search
CPC ........ H02K 1/22; H02K 1/12; H02K 11/0094; H02K 11/20; G01T 1/2985; G01T 7/00; G02B 17/002; H04B 10/11
USPC .................................................. 398/118–131
See application file for complete search history.

(56) References Cited

U.S. PATENT DOCUMENTS

| | | | | |
|---|---|---|---|---|
| 4,555,631 A | * | 11/1985 | Martens | A61B 6/56 398/114 |
| 4,796,183 A | * | 1/1989 | Ermert | H01P 1/068 378/10 |
| 4,900,117 A | | 2/1990 | Chen | |
| 4,996,435 A | * | 2/1991 | Keller | H04B 10/801 250/551 |
| 5,010,254 A | * | 4/1991 | Moore | A61B 6/56 250/551 |
| 5,134,639 A | * | 7/1992 | Vekstein | H04B 10/801 250/551 |
| 5,229,871 A | * | 7/1993 | Czarnek | A61B 6/56 359/15 |
| 5,336,897 A | * | 8/1994 | Watanabe | H04B 10/801 250/551 |
| 5,354,993 A | * | 10/1994 | Kedmi | A61B 6/56 250/551 |
| 5,469,488 A | * | 11/1995 | Ono | A61B 6/08 250/551 |
| 5,991,478 A | * | 11/1999 | Lewis | H04B 10/801 385/25 |
| 6,104,849 A | | 8/2000 | Lewis et al. | |
| 6,128,426 A | * | 10/2000 | Einhorn | B64G 1/66 385/25 |
| 6,327,327 B1 | * | 12/2001 | Herold | A61B 6/56 378/15 |
| 6,335,811 B1 | * | 1/2002 | Sakanaka | H04B 10/11 398/129 |
| 6,353,693 B1 | * | 3/2002 | Kano | G02B 6/3604 385/25 |
| 6,385,367 B1 | * | 5/2002 | Rogers | G02B 6/3604 385/25 |
| 6,396,613 B1 | * | 5/2002 | Harrison | A61B 6/56 398/106 |
| 6,718,005 B2 | * | 4/2004 | Hamada | A61B 6/56 250/551 |
| 6,907,161 B2 | | 6/2005 | Bowman | |
| 6,937,787 B2 | * | 8/2005 | Schilling | A61B 6/56 385/26 |
| 6,980,714 B2 | | 12/2005 | Lo et al. | |
| 7,010,191 B2 | | 3/2006 | Poisel et al. | |
| 7,466,794 B2 | * | 12/2008 | Krumme | H04B 10/801 378/15 |
| 7,489,871 B2 | * | 2/2009 | Takahashi | H04B 10/1125 398/129 |
| 7,792,400 B1 | | 9/2010 | Zhang et al. | |
| 7,848,478 B1 | * | 12/2010 | Huffman | A61B 6/035 378/15 |
| 8,126,298 B2 | * | 2/2012 | Stark | G08C 17/06 385/26 |
| 8,285,146 B2 | | 10/2012 | Lo et al. | |
| 8,355,609 B2 | | 1/2013 | Popp et al. | |
| 8,611,753 B2 | | 12/2013 | Lo et al. | |
| 9,119,589 B2 | | 9/2015 | Zou | |
| 2002/0015469 A1 | * | 2/2002 | Oshima | A61B 6/56 378/15 |
| 2003/0156678 A1 | * | 8/2003 | Hamada | A61B 6/56 378/4 |
| 2004/0062344 A1 | * | 4/2004 | Popescu | A61B 6/56 378/15 |
| 2004/0086222 A1 | * | 5/2004 | Bowman | G02B 6/3604 385/26 |
| 2004/0141686 A1 | * | 7/2004 | Schilling | A61B 6/56 385/26 |
| 2005/0013535 A1 | * | 1/2005 | Popescu | A61B 6/56 385/26 |
| 2005/0069249 A1 | * | 3/2005 | Lo | G02B 6/3604 385/26 |
| 2007/0086782 A1 | * | 4/2007 | Schilling | A61B 6/035 398/141 |
| 2007/0230654 A1 | * | 10/2007 | Chappo | A61B 6/035 378/15 |
| 2007/0242798 A1 | * | 10/2007 | Popescu | A61B 6/56 378/21 |
| 2008/0069495 A1 | * | 3/2008 | Hirohashi | G02B 6/3604 385/25 |
| 2008/0145062 A1 | * | 6/2008 | Heuermann | H04B 10/801 398/140 |
| 2009/0067074 A1 | * | 3/2009 | Koitabashi | H04B 10/801 359/861 |
| 2011/0026938 A1 | * | 2/2011 | Lo | G02B 7/24 398/202 |
| 2011/0206319 A1 | * | 8/2011 | Krumme | H01G 5/01 385/26 |
| 2012/0207430 A1 | | 8/2012 | Zhang et al. | |
| 2012/0237198 A1 | * | 9/2012 | Bowman | G02B 6/3604 398/1 |
| 2012/0280115 A1 | | 11/2012 | Lo et al. | |
| 2013/0279647 A1 | * | 10/2013 | Krupica | G01N 23/046 398/115 |
| 2015/0228403 A1 | * | 8/2015 | Zwemmer | H01F 38/18 307/104 |
| 2015/0289306 A1 | * | 10/2015 | Poulo | A61B 6/56 370/254 |

\* cited by examiner

MIRROR-RING ASSEMBLY FOR BI-DIRECTIONAL OPTICAL COMMUNICATION BETWEEN A ROTOR AND A STATOR

BACKGROUND

Field

Embodiments disclosed herein relate generally to communication between a rotor and a stator, and, more particularly, to bi-directional communication between a rotor and a stator using a tangentially directed beam and a curved mirror arranged on the stator to direct the optical beam between the rotor and the stator.

Description of the Related Art

Many applications require the transmission of signals between a stationary structure (the stator) and a rotating structure (the rotor). Conventionally, slip rings are used for these applications. The slip ring allows for unlimited rotations of the rotor relative to the stator, in contrast to a flexible cable, which will fail after a finite number of rotations.

For example, one application is computed tomography (CT). CT scanners transmit data across a rotary interface. In order to enable such data transmission, slip rings are commonly employed. A slip ring is an electromechanical device that allows the transmission of power and electrical signals between the stator and the rotor. A slip ring can be used in any electromechanical system that requires rotation while transmitting power or signals.

A slip ring can include a stationary graphite or metal contact (brush) that rubs on the outside diameter of a rotating metal ring. As the metal ring turns, the electrical current or signal is conducted through the stationary brush to the metal ring, making the connection. Additional ring/brush assemblies can be stacked along the rotating axis to provide additional capability. Either the brushes or the rings are stationary and the other component rotates. Rotary transformers can be used as an alternative to slip rings in high-speed and/or low-friction applications. Some application use mercury-wetted slip rings, which are noted for their low resistance and stable connection. Mercury-wetted slip rings use a different principle and replace the sliding brush contact with a pool of liquid metal molecularly bonded to the contacts. During rotation, the liquid metal maintains the electrical connection between the stationary and rotating contacts. Disadvantageously, the toxicity of mercury can create safety risks. Accordingly, applications involving food manufacturing or processing, pharmaceutical equipment, or any other use where contamination could be a serious threat conventionally use precious metal contacts.

For applications using/generating high data rates such as CT scanners, the low data rates of electrical transmissions over slip rings make slip rings impractical. Optical rotary joints have been developed to support higher data transmission rates across rotary interfaces. Optical communication is capable of transmitting data at much higher rates than electrical communication techniques.

Conventional optical rotary joints generally include one or more light sources that emit optical signals predominantly radially between the stator and the rotor. These conventional optical rotary joints also use reflectors that have a conical shape (e.g., a hyperbolic or elliptical shape) to direct the radial light beams onto an optical receiver located at a focal point of the conical shape. The optical sources are conventionally spaced circumferentially about the rotor, and the reflectors and receivers are spaced circumferentially about the stator. Conventionally, the path of optical data transmission across the rotary joint (i.e., between the rotor and stator) is in a radial direction with respect to the rotor axis. Disadvantageously, these conventional optical rotary joints only transmit information in one direction, making many modern communication protocols (e.g., TCP/IP), and many error-correction techniques impractical for conventional optical rotary joints. Further, predominantly radial transmission of optical signals between the rotor and the stator results in an unfavorable trade-off between using a large number of optical sources/detectors and using large numerical aperture (NA) optical receivers/fibers.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1:
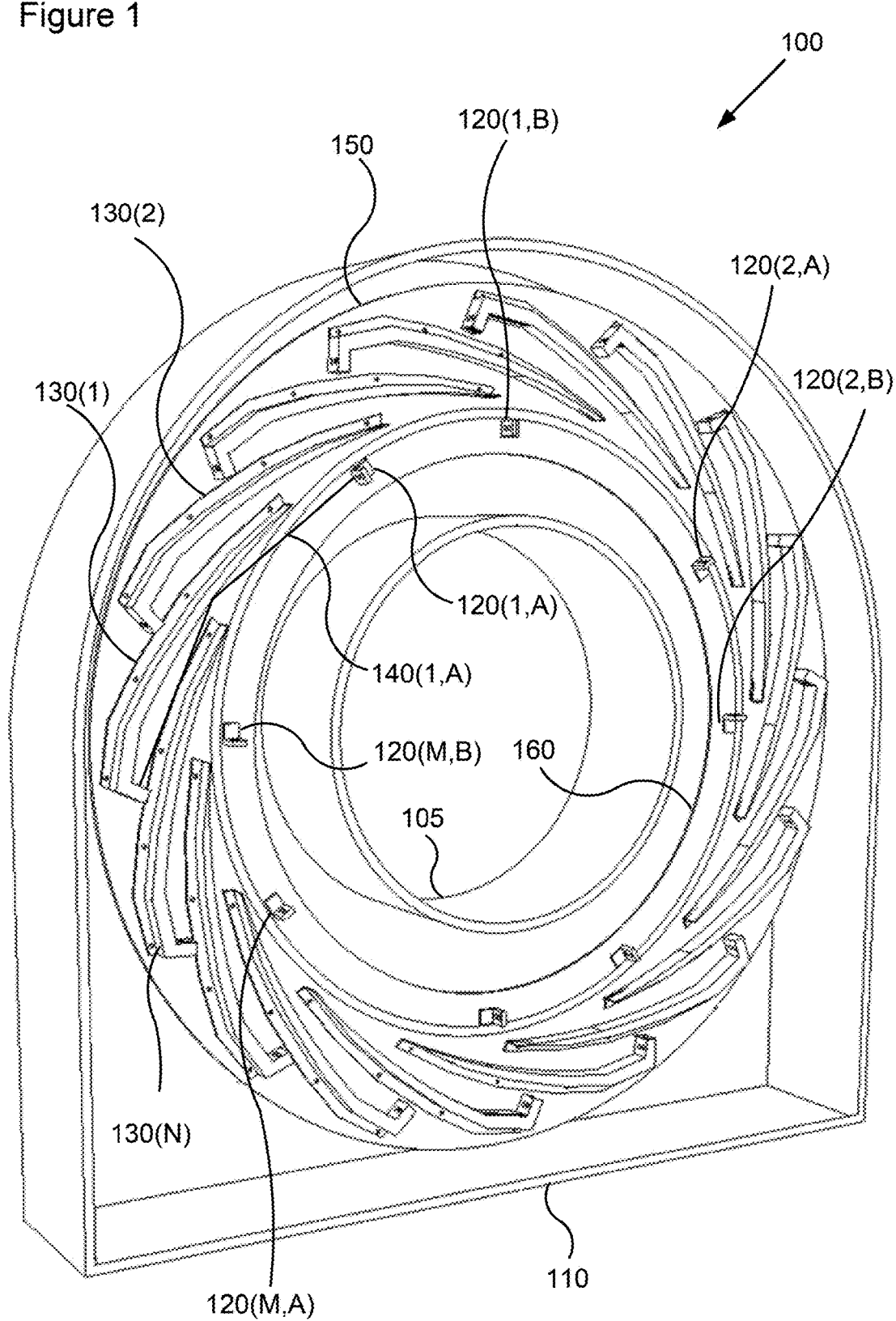
FIG. 1 shows a drawing of one implementation of a mirror ring assembly for communicating between a stator and a rotor.

In one embodiment, the present disclosure provides a mirror-ring apparatus, comprising: (i) a stator; (ii) a rotor configured to rotate relative to the stator; (iii) a first downlink optical source arranged on the rotor and configured to provide a downlink beam radiating at a downlink angle that is predominantly orthogonal to a radial direction from a center of rotation of the rotor, wherein the first downlink optical source encodes data packets on downlink beam of the first downlink optical source; (iv) a plurality of downlink receivers arranged on the stator and configured to receive light from the first downlink optical source and decode the data packets; (v) a plurality of stator mirrors arranged on the stator, wherein each stator mirror is configured to reflect the downlink beam from the first downlink optical source to the corresponding downlink optical receiver, when a rotation angle of the rotor is within a corresponding angle interval of a first plurality of angle intervals; (vi) a plurality of uplink optical sources connected to the stator, wherein each optical source is configured to transmit an uplink beam directed at an angle predominantly orthogonal to the radial direction; and (vii) a first uplink optical detector arranged on the rotor and configured to receive the uplink optical beam of the corresponding uplink optical source when the rotation angle of the rotor is within the corresponding angle interval of the first plurality of angle intervals.

In another embodiment, the present disclosure provides a communication method comprising: (i) partitioning the data into a plurality of packets; (i) concatenating a header including reassembly information to each of the packets; (ii) concatenating error-correction data to each of the packets; (iii) transmitting, from the rotor to the stator, the concatenated data packets using a plurality of optical channels between the rotor and the stator; (iv) receiving, at the stator, the transmitted data packets from the rotor; (v) detecting errors in the received data packets using the error-correction data; (vi) correcting detected errors using an error-correction method; and (vii) reassembling the data from the received date packets according to the reassembly information of the headers of the data packets, (viii) wherein each optical channel of the plurality of optical channels includes an optical beam being transmitted from a transmitter fixed to the rotor and the optical beam is transmitted at an angle predominantly orthogonal to a radial direction of the rotor, the optical beam from the transmitter is reflected from a stator mirror fixed to the stator and configured to reflect the optical beam onto a receiver fixed to the stator when a rotation angle of the rotor is within a predefined interval of angles, and (ix) each data packet is transmitted redundantly using at least two optical channels that have respective stator mirrors configured to reflect the corresponding optical beams, and the respective interval of angles of each of the at least two optical channels the is staggered relative to other intervals of angles of the at least two optical channels Many communication protocols use bi-directional communication, which cannot be performed using a conventional optical rotary joint that is capable of only unidirectional communication. Additionally, conventional optical rotary joints often use large numerical aperture (NA) detectors, which can have undesirable properties (e.g., reduced detection efficiency). Further, conventional optical rotary joints can require the acquisition of rotary encoder information indicating the rotation angle of the rotor. This rotary encoder information can be used to cease transmission during transition times when the communication interface on the rotor is transitioning between two communication interfaces on the stator. Ceasing transmission during transition times prevents prevent loss of data by postponing data transmissions until after the transition when communications is reestablished between the rotor and the stator.

In contrast to conventional optical rotary joints, the optical rotary joints described herein have predominantly tangential rather than radial optical channels. Predominantly tangential optical channels means that, relative to the radial direction defined using the center of rotation of the rotor, the optical beam is less than 45° away from a ray that is orthogonal to the radial direction. These predominantly tangential optical channels enable bidirectional communication. Further, the use of tangential optical channels enables creating an optical channel in which the acceptance angle of the optical receiver can be smaller than the corresponding rotation interval of the rotor (as discussed in regards to FIG. 7). Thus, tangentially directed optical channels can be used to achieve smaller NAs without increasing the number of optical receivers and detectors. Moreover, the curvature of the mirror for a tangential optical channel can be optimized to accommodate a wide variety of arrangements of the optical sources and detectors along the rotor and the stator. This flexibility in arranging the optical communication channels enables the tangential channel topology to be tailored to many different applications and design requirements. Also, advantageously, the system of communication using tangential optical channels can be performed without access to rotary encoder information and without loss of transmitted data during transitions between stator and rotor communication interfaces.

Referring now to the drawings, wherein like reference numerals designate identical or corresponding parts throughout the several views, FIG. 1 shows an oblique view of an opto-electronic mirror-ring assembly 100. The mirror-ring assembly 100 includes a gantry 110 that houses a stator 150 and a rotor 160. At the center of the gantry 110 is a bore 105 that provides an opening in which a subject can be placed. For example, the mirror-ring assembly 100 can be used for a computed tomography (CT) system. In the CT system, instrumentation for taking projective measurements, such as X-ray projections, is arranged around the bore 105 and fixed to the rotor 160. The projection data is communicated to the stator 150 from the rotor 160 by transmitting data packets using optical signaling.

To perform CT image reconstruction, projection measurements at different projection angles are used to reconstruct an image of the subject being measured. Projection measurements at a range of projection angles can be obtained by arranging the subject to be imaged within in the bore 105, and the projection-measurement instrumentation can be arranged at fixed locations around the rotor 160. Projection data at different projection angles are acquired as the rotor 160 and projection-measurement instrumentation are rotated around the subject. The projection data thus acquired is communicated from the rotor 160 to the stator 150, and the stator 160 then relays the projection data to computational hardware performing the CT image reconstruction method.

The CT apparatus is one example of an application in which data is transferred between the rotor 160 and the stator 150. In addition to transmitting projection data in a CT apparatus, there are many other applications that benefit the capability to rapidly transmit data between the rotor 160 and the stator 150. In general, the opto-electronic mirror-ring assembly 100 can be used for any application in which information is transmitted between the rotor 160 and the stator 150.

Returning to FIG. 1, the rotor 160 of the mirror-ring assembly 100 includes several groupings of rotor optical assemblies 120(1) through 120(M). In FIG. 1, each grouping includes two rotor optical assemblies, e.g., the rotor optical assembly 120(1,A) and the rotor optical assembly 120(1,B) are one grouping. Other groupings include the rotor optical assemblies 120(2,A) and 120(2,B), and also include the rotor optical assemblies 120(M,A) and 120(M,B). Each rotor optical assembly in a grouping is located in close proximity to all other rotor optical assemblies of the same grouping (e.g., rotor optical assembly 120(1,A) is arrange near the rotor optical assembly 120(1,B)), and each rotor optical assembly transmits and receives light from a unique stator mirror and stator optical assembly (i.e., no stator mirror and stator optical assembly receives or transmits simultaneously to more than one rotor optical assembly).

In FIG. 1, examples of groupings of rotor-optical assemblies include grouping 120(1), which includes the rotor optical assemblies 120(1,A) and 120(1,B); 120(2), which includes the rotor optical assemblies 120(2,A) and 120(2,B); and 120(M), which includes the rotor optical assemblies 120(M,A) and 120(M,B). In the exemplary embodiment of FIG. 1, each rotor optical assembly includes both a transmitter as a downlink to transfer information from the rotor 160 to the stator 150 and a receiver as an uplink to transfer information from the stator 150 to the rotor 160.

The mirror assemblies 130(1), 130Q through 130(N) each includes a curved mirror surface that reflects the light from the respective transmitter, e.g., from the rotor-optical assembly 120(1,A) onto an optical downlink receiver fixed to the corresponding mirror assembly, e.g. the mirror assembly 130(1). The mirror assembly 130(1) also includes an uplink transmitter that transmits information from the stator 150 to the rotor 160. As shown in FIG. 1, the optical path 140(1,A) between the rotor optical assembly 120(1,A) and the corresponding downlink receiver of the mirror assembly 130(1) includes a reflection from the mirror surface of the mirror assembly 130(1). The curvature of the mirror surface is optimized to direct light from the downlink transmitter of the rotor optical assembly 120(1,A) onto the downlink receiver of the mirror assembly 130(1) so long as the rotation angle of the rotor 160 is within a predefined interval of angles.

In one implementation, the predefined interval of angles includes all rotation angles of the rotor for which light from the downlink transmitter of the rotor optical assembly 120 (1,A) is incident on the mirror surface of the mirror assembly 130(1). As the rotor rotates clockwise with respect to the stator, the rotation angle of the rotor passes through all of the predefined angles and the optical beam of the rotor optical assembly 120(1,A) transitions from being incident on mirror assembly 130(1) to being incident on mirror assembly 130(2) and the optical beam is detected using the downlink receiver on the mirror assembly 130(2) as the rotation angle of the rotor passes through a second predefined interval of angles. While apparatus is described using the example of a clockwise rotation direction for the rotor, the method and apparatus described herein can also be implemented by rotating the rotor in counter-clockwise direction. Between the first interval of angles and the second interval of angles is a gap when the downlink optical beam of the rotor optical assembly 120(1,A) is transitioning between mirror assemblies, and is therefore prevented from communicating while the rotation angle of the rotor is within this gap. However, communication is not completely lost between the rotor and the stator because the rotor optical assembly 120(1,B) continues to communicate as the rotor optical assembly 120(1, A) transitions between mirror assemblies. The rotor optical assembly 120(1,B) and the rotor optical assembly 120(1,A) are arranged such that their respective transitions occur at staggered and non-overlapping rotor angles.

The other groupings of rotor optical assembly are similarly situated to have staggered and non-overlapping transitions between mirror assemblies. Thus, when each grouping transmits identical data over its rotor optical assemblies, the communication of data will be continuous because there will be at least one rotor optical assembly of the grouping that is not transitioning between mirror assemblies and is therefore communicating data. This is true for all rotation angles of the rotor. Thus, although at certain rotation angles the transmission of data is interrupted for individual rotor optical assemblies, communication is not interrupted for the grouping as a whole because of the staggered transitions for rotor optical assemblies within the grouping.

Figure 2A:
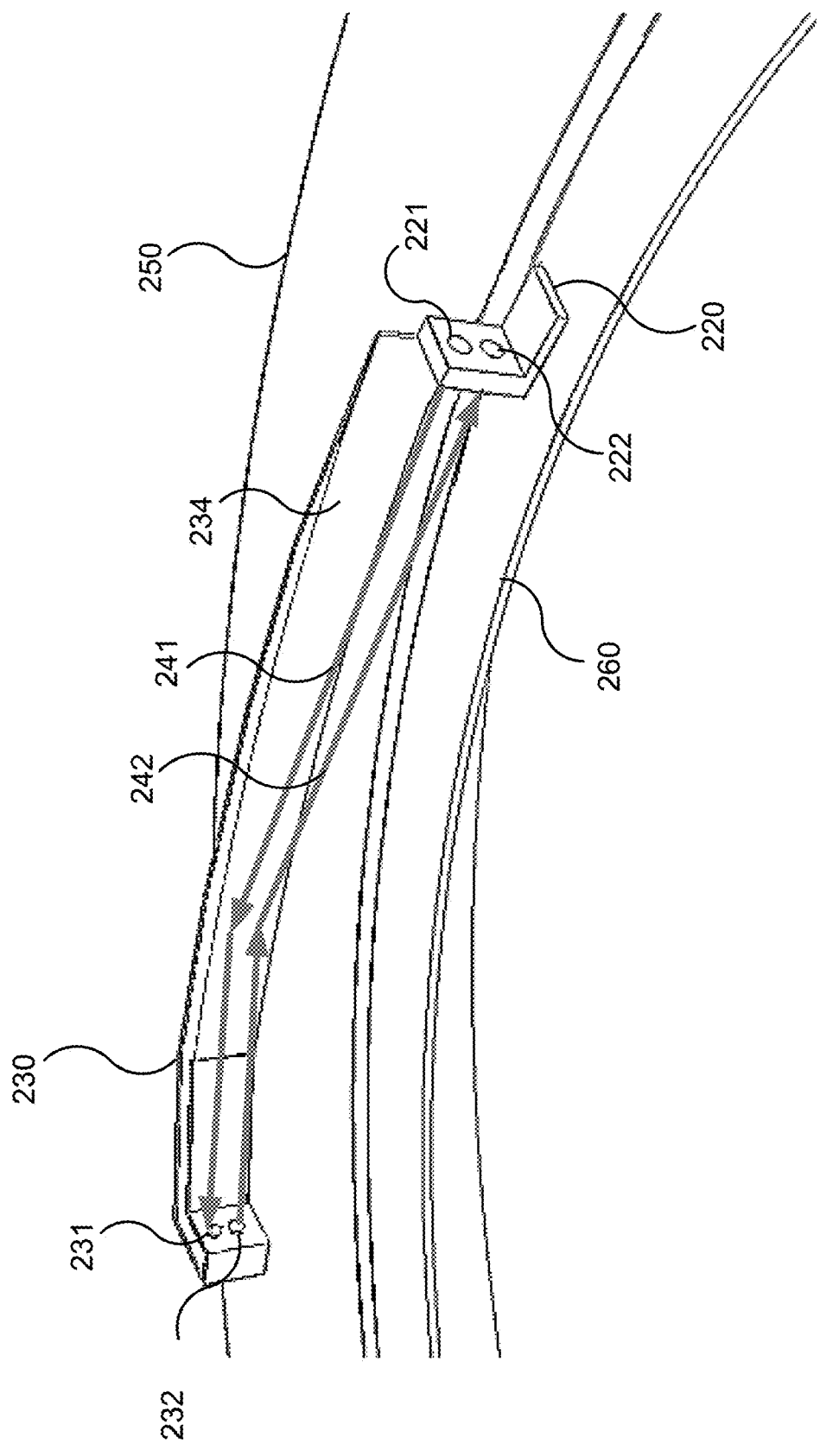
FIG. 2A shows a drawing of the uplink and downlink optical paths of a communication channel when the rotor is at a first angle.
Figure 2B:
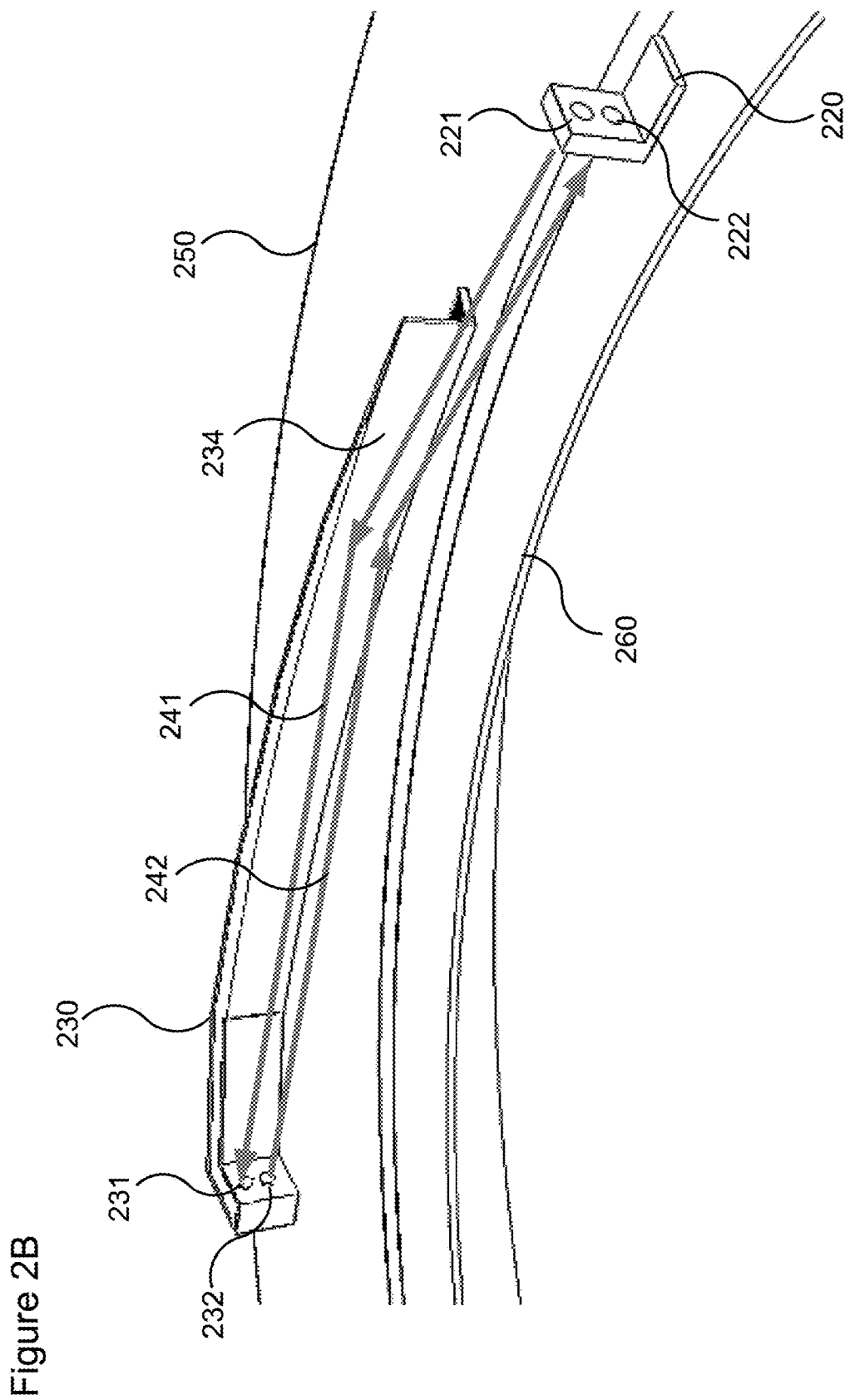
FIG. 2B shows a drawing of the uplink and downlink optical paths of the communication channel when the rotor is at a second angle.

FIGS. 2A and 2B show an implementation of a mirror assembly 230 fixed to the stator 250 and the rotor optical assembly 220 fixed to the rotor 260. In FIG. 2A, the rotor 260 is at a first angle, and in FIG. 2B the rotor 260 is at a second angle. The light from the downlink transmitter 221 of the rotor optical assembly 220 is transmitted along an optical path 241 from the downlink transmitter 221 to the downlink receiver 231 that is fixed to the mirror assembly 230. The rotor optical assembly 220 also includes an uplink receiver 222 that receives signals along the optical path 242 from the uplink transmitter 232 that is fixed to the mirror assembly 230. The section of the optical path 241 from the downlink transmitter 221 to the mirror surface 234 is at a fixed angle relative to the rotor 260.

As the rotor 260 rotates relative to the stator 250, the spot at which light from the downlink transmitter 221 is incident upon the mirror surface 234 translates across the mirror surface 234. As the rotor 260 rotates clockwise through an interval of angles including the first and the second angles shown respectively in FIGS. 2A and 2B, the incident spot will start at the proximate end of the mirror surface 234 (i.e., the end of the mirror surface 234 closest to the downlink receiver 231 and uplink transmitter 232) and scan across the mirror surface towards the distant end (i.e., the end of the mirror surface 234 farthest to the downlink receiver 231 and uplink transmitter 232) until the incident spot from the downlink transmitter translates past the distant end of the mirror surface and transitions to another mirror assembly.

The shape of the mirror surface 234 is optimized to direct light incident from the downlink transmitter 221 to the downlink receiver 231 regardless of where the incident spot is along the mirror surface 234. In one implementation, the light beam from the downlink transmitter 221 is a narrow pencil beam. For example the light beam from the downlink transmitter 221 can be a Gaussian beam, a top-hat beam, or a collimated beam from a laser diode.

In one implementation, the light beam from the uplink transmitter 232 is a fan beam that is narrow in the direction orthogonal to the rotation plane of the rotor 260 and fans out parallel to the rotation plane of the rotor 260. The fan beam is larger than the uplink receiver 222 spilling over the edges of the uplink receiver 222 in the direction parallel to the rotation plane of the rotor 260. As the rotor rotates clockwise, the uplink receiver 222 will overlap a portion of the fan beam enabling uplink communication while the downlink optical spot is incident on the mirror surface 234. In one implementation, the uplink source transmits a higher optical power to compensate for the only partial overlap between the uplink beam and the uplink receiver, and the uplink receiver is a large-area photodetector. Conventionally, large-area photodetectors have slower response times due to having a large capacitance. Advantageously, for conventional applications such as CT, the uplink channel can have lower bandwidth than the downlink channel without adverse effects.

In one implementation, as shown in FIGS. 2A and 2B, the optical path 242 includes a reflection from the mirror surface 234. Thus, rather than being incident at a spot along the mirror surface 234, the incident light from the uplink transmitter 232 traces a line along the mirror surface 234 extending from the proximate end of the mirror surface 234 to the distant end. In one implementation, the optical path 242 is a straight line from the uplink source 232 to the uplink receiver 222 without a reflection from the mirror surface 234.

In one implementation, the downlink is a high-speed channel, and the uplink is a low-speed channel. For example, in a CT apparatus the instrumentation connected to the rotor generates large amounts of data that is transferred to the stator, requiring a high-speed data channel. The uplink channel can be a lower speed data channel for communicating a smaller amount of information to the instrumentation, and for performing a handshake operation to resend buffered data when an error occurs on the downlink channel, for example.

Although FIGS. 2A and 2B show a single uplink channel and a single downlink channel, multiple downlink transmitters and multiple uplink receivers can be arranged within the rotor optical assembly 220. For example, the transmitters and receivers can be stacked in a line along the direction orthogonal to the rotation plane of the rotor 260. Correspondingly, multiple uplink transmitters and multiple downlink receivers can be arranged within the mirror assembly 230 to correspond to their respective counterparts on the rotor optical assembly 220. The mirror surface can also be enlarged along the direction orthogonal to the rotation plane of the rotor 260 to accommodate the additional optical channels.

In one implementation, the mirror surface 234 is curved in one dimension and flat in the other dimension. For example, the mirror surface 234 can be flat in the direction orthogonal to the rotation plane of the rotor 260, but curved in the other direction.

The downlink transmitter 221 and the uplink transmitter 232 can be any optical source or sources having any wavelength or wavelengths including, for example, a semiconductor laser diode, a vertical cavity surface emitting laser diode, or a fiber-coupled laser source. The data can be encoded on the uplink and downlink beams by directly modulating the downlink transmitter 221 and the uplink transmitter 232, or by modulating the uplink and downlink beams after they have respectively been transmitted by the uplink and downlink transmitters.

The uplink receiver 222 and the downlink receiver 231 can be any optical detector including, for example, a fiber-coupled detector, a photodiode, a photo-resistor, and an avalanche photodiode. The uplink receiver 222 and downlink receiver 231 can also include anti-reflection coatings.

The mirror surface 234 can be any reflecting surface at the wavelength of the downlink transmitter 221 and the uplink transmitter 232.

Figure 3:
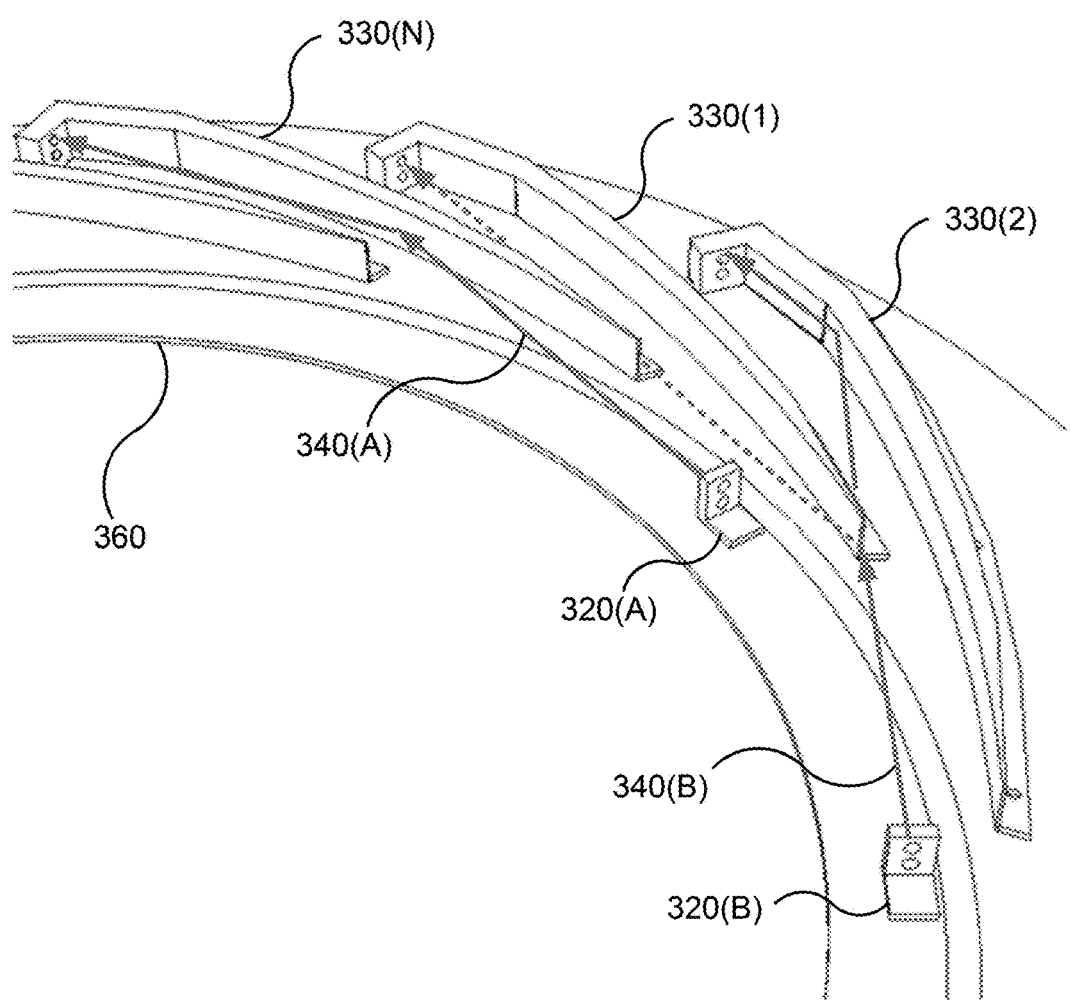
FIG. 3 shows an implementation of a rotor optical assembly that, as the rotor rotates clockwise, is transitioning from communicating with a first mirror assembly to communicating with a second mirror assembly.

FIG. 3 shows an implementation of the transition of communication between mirror assemblies. In this implementation, the two rotor optical assemblies 320(A) and 320(B) transmit the same data. This redundancy prevents a loss of information when the data transmission from 320(B) is interrupted during the transition from mirror assembly 330(1) to mirror assembly 330(2).

As the rotor 360 rotates clockwise, the optical path 340(B) reaches the distant end of the mirror assembly 330(1) and the data transmission is temporarily lost during the transition until the rotor 360 rotates far enough clockwise to complete the transition and the optical pathway 340(B) is incident on the proximate end of the mirror assembly 330(2). Once the transition between mirror assemblies is completed, the rotor optical assembly 320(B) initiates communication between the rotor optical assembly 320(B) and the mirror assembly 330(2). During this transition time, the redundant data transmission between the rotor optical assembly 320(A) and the mirror assembly 330(N) results in no data being lost as a result of the temporary interruption to data transmitted from rotor optical assembly 320(B).

As the rotor continues to rotate clockwise, the incident spot of the downlink transmitter of the rotor optical assemblies 320(A) on the mirror assembly 330(N) will arrive at the distant end of the mirror assembly 330(N), and the data transmission from 320(A) is temporarily lost until communication is established between the rotor optical assembly 320(A) and the mirror assembly 330(1). During this transmission, the data is not lost because the data is being redundantly transmitted on both the rotor optical assemblies 320(A) and 320(B), and the transition angles for the rotor optical assemblies 320(A) and 320(B) are staggered. Thus, continuous data transmission is advantageously ensured by the data redundancy of the rotor optical assemblies 320(A) and 320(B) when the rotor optical assemblies 320(A) and 320(B) are arranged to transition between mirror assemblies at non-overlapping times.

Figure 4A:
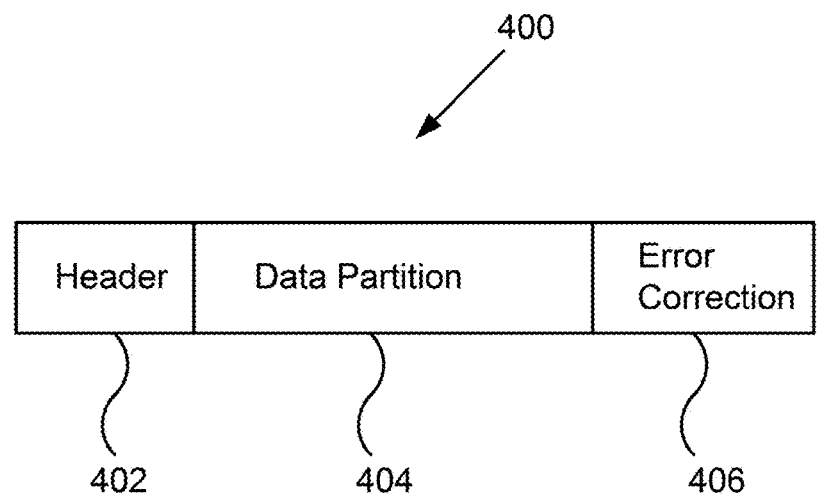
FIG. 4A shows an implementation of a data packet to which both a header and error-correction data have been concatenated.
Figure 4B:
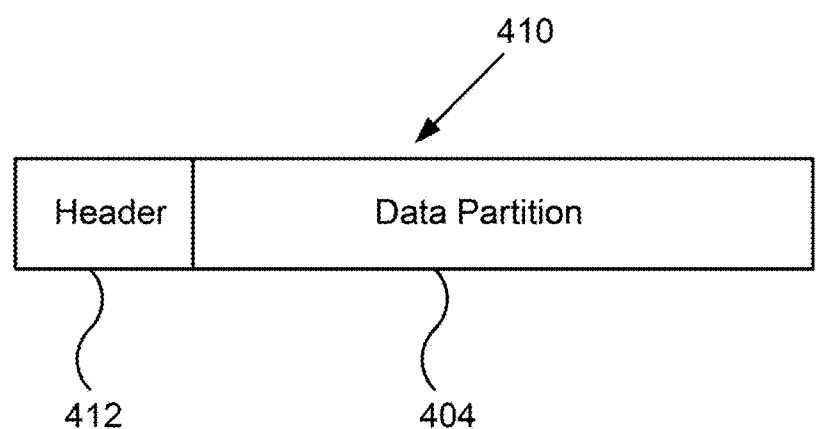
FIG. 4B shows an implementation of a data packet to which a header has been concatenated.

FIGS. 4A and 4B show two implementations of packaging the data into packets. In FIG. 4A, the data is partitioned into data partitions 404, and each data partition is concatenated with a header 402 and with error-correction data 406 to generate a data packet 400. In FIG. 4B, the data is partitioned into data partitions 404, and each data partition is concatenated with a header 412 to generate a data packet 410. In one implementation, error-correction data is included in the header 412.

To achieve uninterrupted data transmission, in one implementation, the transmit data stream is electronically split into a series of data packets 400. Each data packet 410 includes a header 402 that contains packet identification information and cyclic redundancy check (CRC) data. The header 402 can also include supplementary information. In one implementation, an industry standard protocol (e.g., TCP/IP), or other suitable proprietary protocol, may be used to generate the header 412.

Figure 5:
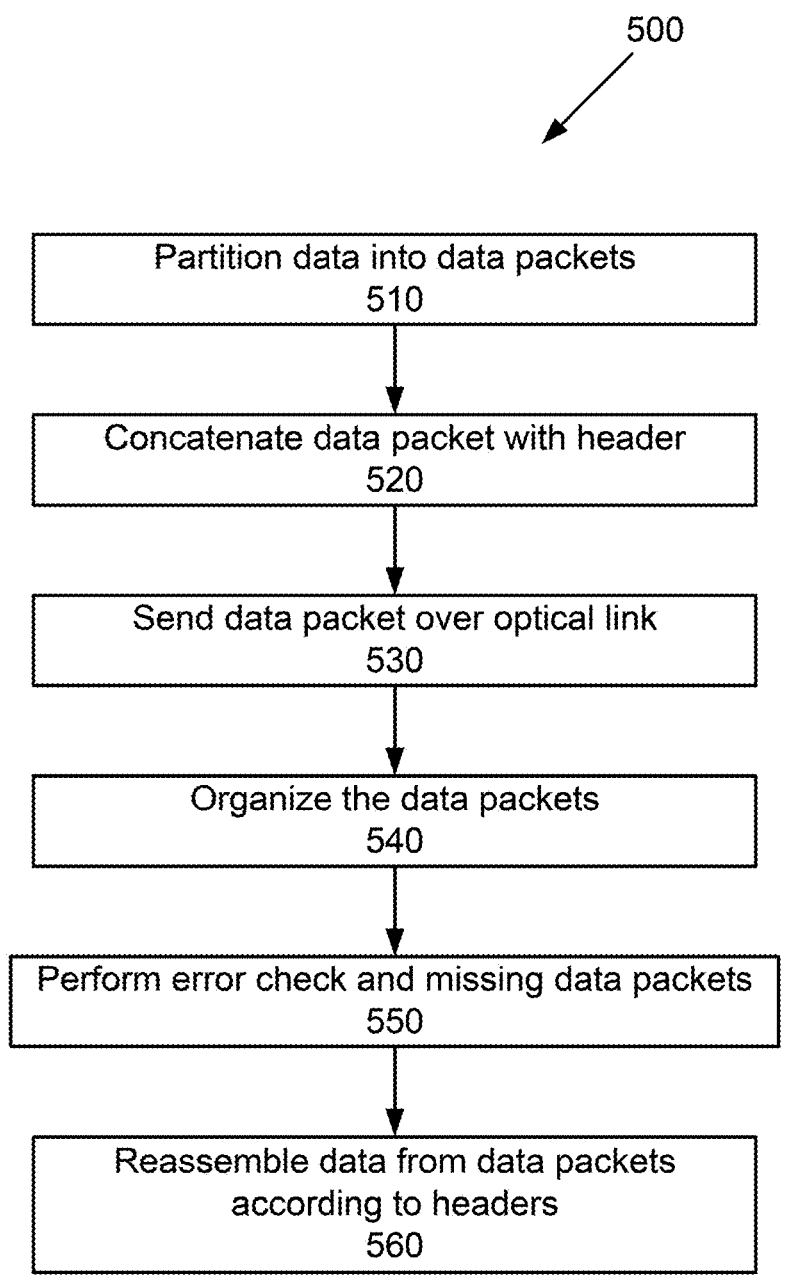
FIG. 5 shows an implementation of a method of communicating data by partitioning data into data packets, transmitting the data packets over an optical communication channel between the rotor and the stator, and then reassembling the data from the transmitted data packets.

FIG. 5 shows a method 500 of partitioning data into data packets 410 and sending the data packets 410 from the rotor to the stator before reassembling the data. In step 510 of method 500, the data is divided into data packets 410 of a predefined size. For example, the size of the data partitions can be determined by the choice of error-correction method performed in step 550.

After partitioning the data into packets, in step 520 of method 500, the data packets are concatenated with header information. For example, the header information can include information used for routing the data and for reassembling the data. Further, in certain implementations, the header can also include information regarding the type of information in the data packet, the packet length, the method of encoding the packet, the type of error correction, the priority of the data, etc.

As shown in FIGS. 4A and 4B the data packet can also include error correction data, and the error correction data can be included in the header or can be separate from the header. There are many types of error correction that can be performed. Error correction can be divided into two steps: (i) error detection, and (ii) error correction. Error detection techniques detect errors in order to request that corrupted data be resent or that the data from the data packet be reconstructed to as close as possible to the original data. Methods of error detection include parity bits, checksums, cyclical redundancy checks, cryptographic hash function, and error correcting codes such as low-density parity-check codes. The type of error-correction data concatenated to the data packet can depend on which error-correction method is used.

At step 530 of method 500, the data packets are encoded in an optical beam and transmitted from a detector on the rotor and received by an optical receiver on the stator. The encoding of the data packets onto the optical beams can be performed, e.g., by on-off keying or by amplitude, frequency, or phase modulation. The encoding can be performed by directly modulating the optical source (e.g., performed by directly modulating a laser diode), or by modulating the light after it has been transmitted from the optical source.

At step 530 of method 500, the data packets are organized and can be routed according to their header information. For example, the data packets can be redundant, wherein identical data packets are sent over two separate optical channels. This redundancy ensures that when transmission over one channel is interrupted (e.g., one channel is interrupted during the transition angles between two adjacent receivers as shown in FIG. 3), the information of the data packet is nonetheless communicated between the rotor and the stator because transmission over the data channel is not interrupted. Thus, pairs, triplets, quadruplets, etc. of redundant channels are selected to have offset transition angles. The transition angles of one channel in a grouping are selected to not overlap with any other transition angles of any other channels within the grouping. For example, a grouping can be 120(1,A) and 120(1,B) shown in FIG. 1.

When none of the channels is interrupted (e.g., transitioning between stator mirrors) then the number of identical copies of the data packets transmitted will equal the redundancy of the communication channel. In one implementation, redundant data packets will be collocated in memory, and after error-detection processing those identical data packets without any copies exhibiting errors will be downsized to a single copy of the data packet.

In step 540 of method 500, the data is organized according to the header information and redundant data is discarded. In one implementation, the discarding of redundant data depends on the existence of errors. For example, when no errors are detected in the data packets, then redundant data packets can be discarded, keeping only the minimum number data packets necessary to reassemble the data. When an error is detected, the data packet with the error is discarded and a counterpart data packet without an error is maintained. When there is no counterpart without an error, the error correction is performed.

In one implementation, the order of step 540 and 550 are reversed, such that step 540 is performed after 550 in order to detect errors prior to organizing the data packets.

Alternatively, step 540 and step 550 can be integrated. For example, the error detection can be performed first. Then, if there is a data packet without an error that contains redundant data to an error packet with an error, then the data packet with the error is discarded and the other data packet without an error is maintained. Thus, error correction is only performed on those data packets that cannot be discarded by relying on the existence of a redundant data packet without an error.

In step 550 of method 500, the error detection and error correction is performed on the received data packets. Methods of error detection include parity bits, checksums, cyclical redundancy checks, cryptographic hash function, and error correcting codes such as low-density parity-check codes. When an error is detected in a data packet, an inquiry is made as to whether there is an error-free data packet with information redundant to the data packet containing the error. If so, then the data packet containing the error is discarded. Otherwise, the error is corrected. The error-correction method can be one of a repeat request, an error correction code, and a hybrid scheme.

For example, an automatic repeat request (ARQ) is an error control method for data transmission that makes use of error-detection codes, acknowledgment and/or negative acknowledgment messages, and timeouts to achieve reliable data transmission. An "acknowledgment" is a message sent by the receiver to indicate that it has correctly received a data frame. In one implementation, when the transmitter does not receive the acknowledgment before the timeout occurs (i.e., within a reasonable amount of time after sending the data frame), it retransmits the frame until it is either correctly received or the error persists beyond a predetermined number of retransmissions. The acknowledgment is sent to the rotor using the uplink channel corresponding to the downlink channel.

In one implementation, a negative acknowledgement is sent when there is an error that cannot be overcome through channel and data packet redundancy; otherwise new data packets are continuously sent in the absence of any negative acknowledgements. Three conventional types of ARQ protocols that can be applied are Stop-and-wait ARQ, Go-Back-N ARQ, and Selective Repeat ARQ. Generally, ARQ uses a back channel (e.g., the uplink channel), and can result in increased latency due to retransmissions. Also, ARQ uses buffers and timers for retransmissions, which can result in increased communication, memory, and computational requirements.

Alternatively to a repeat request, the error-correction method can be an error-correcting code (ECC) or forward error correction (FEC) code. ECC and FEC add redundant data, or parity data, to a data packet in order to recover the data of the data packet when a number of errors (up to the capability of the code being used) are introduced during transmission. Since the receiver does not have to ask the sender for retransmission of the data, a back-channel is not required in FEC. EECs can generally be categorized into convolutional codes and block codes. Convolutional codes are processed on a bit-by-bit basis. Block codes are processed on a block-by-block basis, and include, e.g., repetition codes, Hamming codes, multidimensional parity-check codes, Reed—Solomon codes, turbo codes, and low-density parity-check codes (LDPC). The error-correction data concatenated with the data packet can be a block code.

Alternatively to ARQ, ECC, or FEC performed separately, the error-correction method can use a hybrid scheme. The hybrid scheme can be a combination of ARQ and forward error correction. In one implementation, data packets are transmitted with FEC parity data (and error-detection redundancy). The downlink receiver decodes a message using the parity information, and requests retransmission of the data packet using ARQ only if the parity data was not sufficient for successful decoding. In another implementation, data packets are transmitted without parity data (e.g., with error-detection information only). If the downlink receiver detects an error, it requests, using the uplink channel, that FEC information be transmitted using the downlink channel, and the transmitted FEC information is used to reconstruct the original transmitted data packet.

After correcting for errors and removing redundancies in the data packets, step 560 of method 500 performs the process of reassembling the partitioned data from the data packets. The data is reassembled using reassembly information included in the headers of the data packets.

Figure 6:
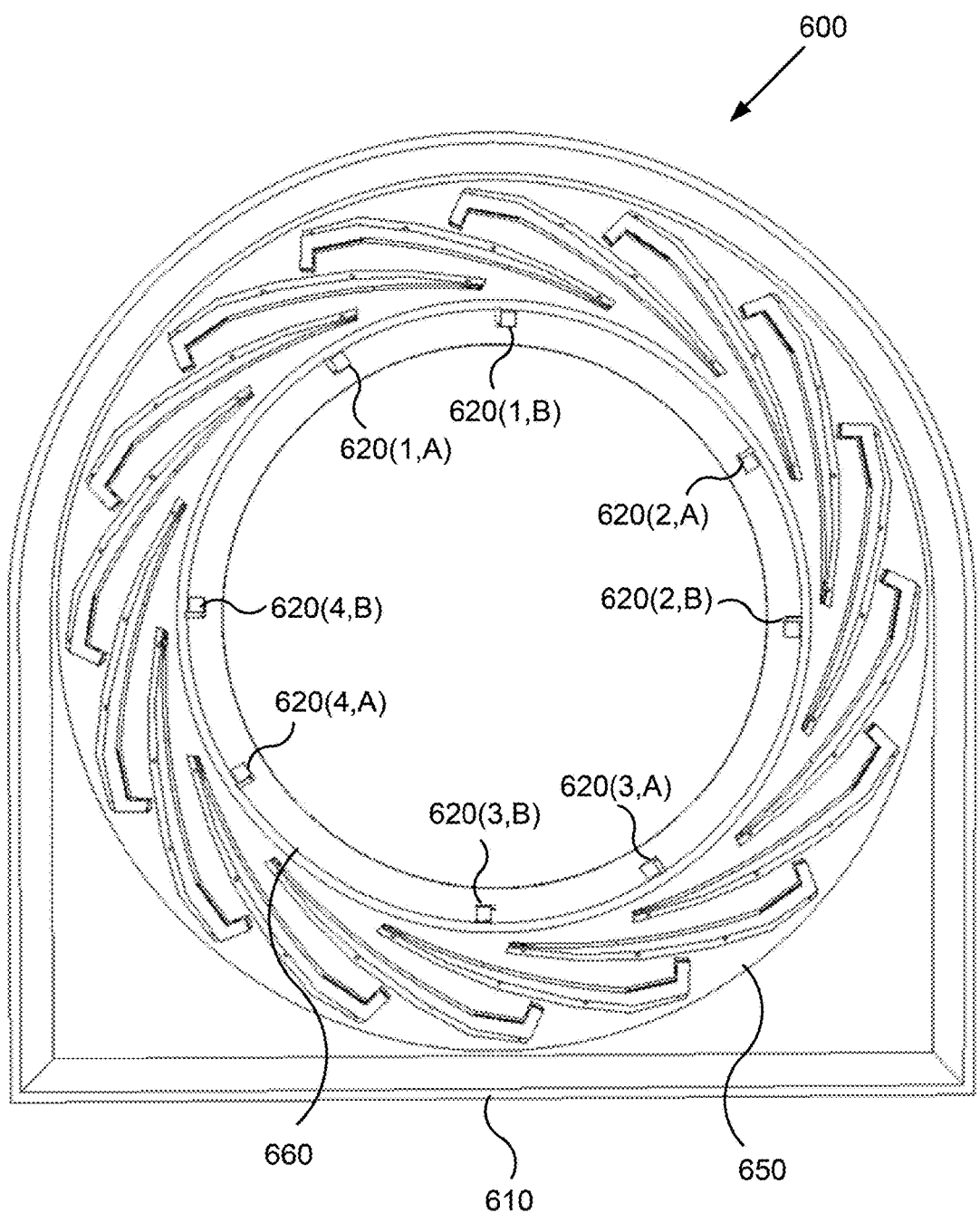
FIG. 6 shows an drawing of one implementation of a mirror ring assembly in which the rotor optical assemblies are grouped into pairs that transmit redundant data.

Multiplicity of data transmitters can be achieved by arranging the rotor optical assemblies in groupings of rotor optical assemblies. For example, the groupings can be in pairs (as shown in FIG. 6), triplets, or other suitable redundant arrangement. Within each grouping, the rotor angle corresponding to transitions between mirror assemblies is staggered among the rotor optical assemblies of the grouping, such that no two rotor optical assemblies of the grouping transition between mirror assemblies at overlapping rotation angles.

In one implementation, the rotor optical assemblies are arranged in pairs (as shown in FIG. 6). Each rotor optical assembly within a pair grouping transmits data packets that are equivalent/redundant with the data packets transmitted by the other rotor optical assembly within the pair. For example, the rotor optical assembly 620(1,A) transmits data packets that are redundant with the data packets transmitted by the rotor optical assembly 620(1,B). Similarly, the rotor optical assembly 620(2,A), 620(3,A), and 620(4,A) transmit data packets that are redundant with the data packets transmitted by their respective counterparts 620(2,B), 620(3,B), and 620(4,B), such that each pair 620(1), 620(2), 620(3), and 620(4) has two optical channels transmitting redundant data packets. When communication for one rotor optical assembly of the grouping is interrupted due to transitioning between mirror assemblies, the other rotor optical assembly is not interrupted because the transitions are staggered among the rotor optical assemblies within each grouping.

In another implementation, the rotor optical assemblies are arranged in triplets and two streams of data are transmitted using the grouping of three rotor optical assemblies. For example, data packets 410 from the two streams of data can be interleaved in round-robin fashion among the three rotor optical assemblies. For example, as the first two data packets, the first rotor optical assembly transmits the first data packet 410 of the first and second data streams. The second rotor optical assembly transmits the first data packet 410 of the second data stream and the second data packet 410 of the first data stream. The third rotor optical assembly transmits the second data packet 410 of the first and second data streams. Next, as the third and fourth data packets, the first rotor optical assembly transmits the third data packet 410 of the first data stream and the second data packet 410 of the second data stream, and so forth in round-robin fashion. Thus, the data is transmitted redundantly in round-robin fashion.

In general, any type of grouping of the rotor optical assemblies can be used, if the grouping enables data packets being transmitted redundantly to prevent loss of data during the transition periods when communication is transitioning between mirror assemblies.

The above examples can each be performed without a rotary encoder measuring the rotation angle of the rotor. However, when rotary encoder information is available, the efficiency of the communication system can be improved by eliminating or at least reducing the redundant transmissions. For example, all of the rotor optical assemblies can be arranged into a single grouping of M rotor optical assemblies, and the grouping is arranged such that none of the transition angles are overlapping (i.e., none of the rotor optical assemblies transitions between mirror assemblies simultaneously with any other rotor optical assembly). Where the number of rotor optical assemblies is M, then M−1 data streams can be continuously transmitted because, at any given rotation angle, at most one rotor optical assembly will be transitioning between mirror assemblies resulting in an interruption to data transmission.

Similarly, if at most two rotor optical assemblies transition at the same rotation angle of the rotor, then using the rotary encoder information, at least M−2 data streams can be continuously transmitted for all rotation angles of the rotor.

When a computer readable memory is also connected to the rotor, then the rotary encoder information can be used to signal the respective transition angles. During these transitions angles, the data packets can be buffered/stored in the computer-readable memory rather than transmitted, and the buffered data packers can be transmitted later when the the rotary encoder information indicates that the transition between mirror assemblies is completed. Thus, although the transmission of data packets through a given optical channel is interrupted during transitions between mirror assemblies, no data is lost because the data packets are buffered and transmitted later.

Using the encoder information has the advantage that the bandwidth requirements are reduced because redundant data is not required to avoid loss of data.

Figure 7:
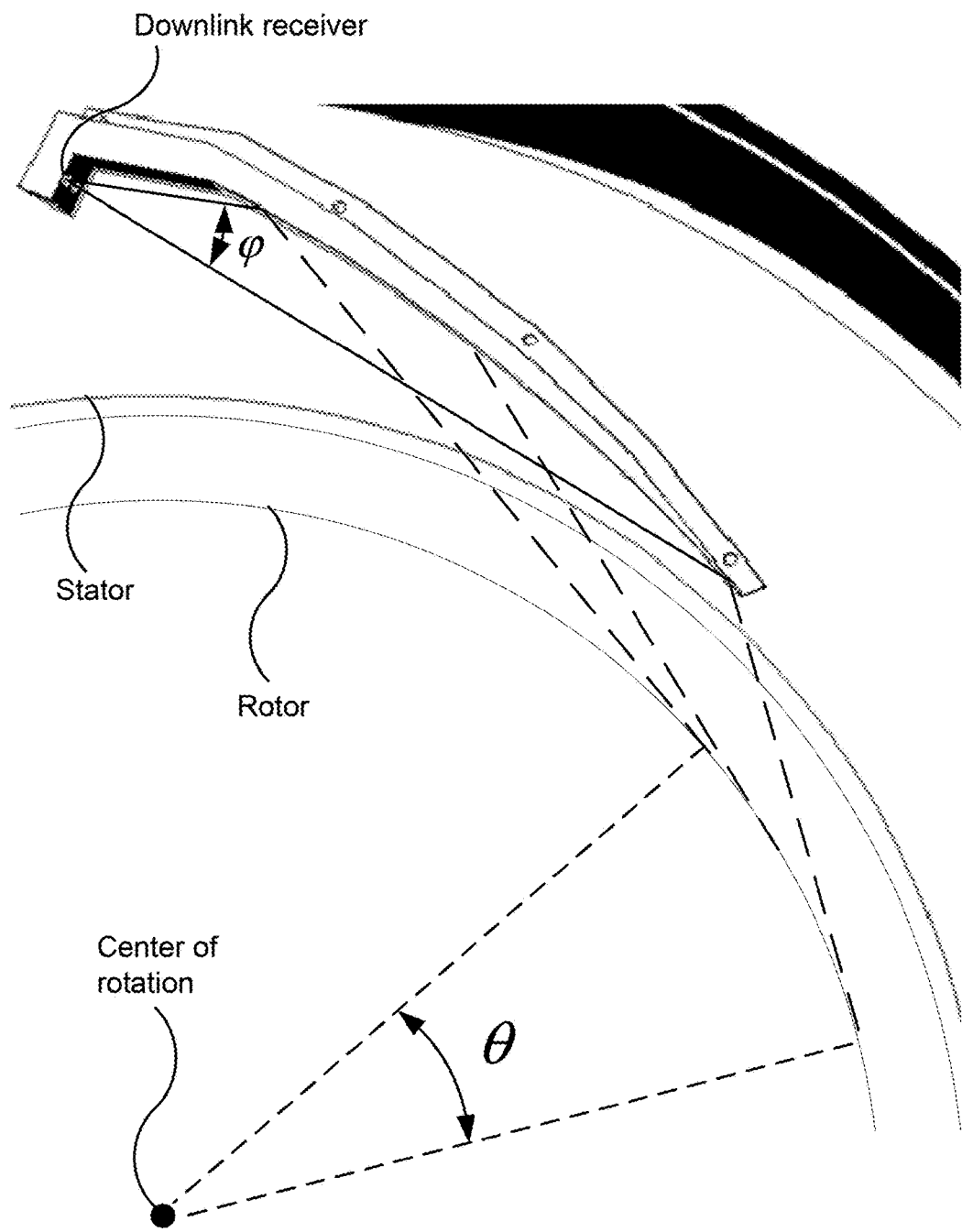
FIG. 7 shows one implementation of a geometry of the angle interval of the rotation angle of the rotor and the span of the incidence angles on the downlink receiver.

FIG. 7 shows an example of the interval of rotation angles $\theta$ in between transition angles. As seen in FIG. 7 the span of angles $\varphi$ incident on the downlink receiver can be advantageously smaller than the rotation interval $\theta$. The ratio of the rotation interval $\theta$ to the span of incidence angles $\varphi$ is determined by the downlink beam angles and the relative positions of the downlink detector, downlink receiver, and the mirror surface. It is generally desirable to have a smaller span of incidence angles because requiring an optical fiber or photodetector to accept a large numerical aperture of incident angles is challenging. For example, it is easier to design optical coatings, such as anti-reflection coatings, for a smaller span of incidence angles. Also, in optical fibers, incidence beams outside the NA of the fiber will couple into the cladding and be lost.

Depending on the application and design constraints, the position and transmit angle of the rotor optical assemblies can be adjusted, as can the relative position of the mirror surface to the downlink receiver and the uplink transmitter. The shape of the mirror surface can be optimized for any configuration of the downlink receiver and the rotor optical assembly. This optimization can be performed using the fact that, for mirrors, the angle of incidence equals the angle of reflection. Starting at a first point where the downlink beam is incident on the mirror surface, a slope of the mirror can be calculated in order to reflect the beam from the mirror surface towards the downlink receiver. Assuming that the mirror surface is approximately linear over small intervals, a second point on the mirror can be determined, where the second point is a small interval from the first point. Next, the rotation angle of the rotor is determined for a downlink beam directed to the second point on the mirror. The slope of mirror at the second point is determined, where this second slope reflects the downlink beam onto the downlink receiver. Again assuming linearity over small intervals, a third point of the mirror a small interval from the second is determined, and the process continues until the shape of the entire mirror has been determined. From these discrete points on the mirror surface, a smooth surface can be obtained by interpolation or a spline fit, for example.

Thus, a mirror surface can be calculated for any position of the rotor optical assembly, downlink beam angle, position of the downlink receiver, and position of the mirror surface relative to the downlink receiver. This flexibility can be used advantageously to optimize the optical communication channel for particular applications.

Figure 8:
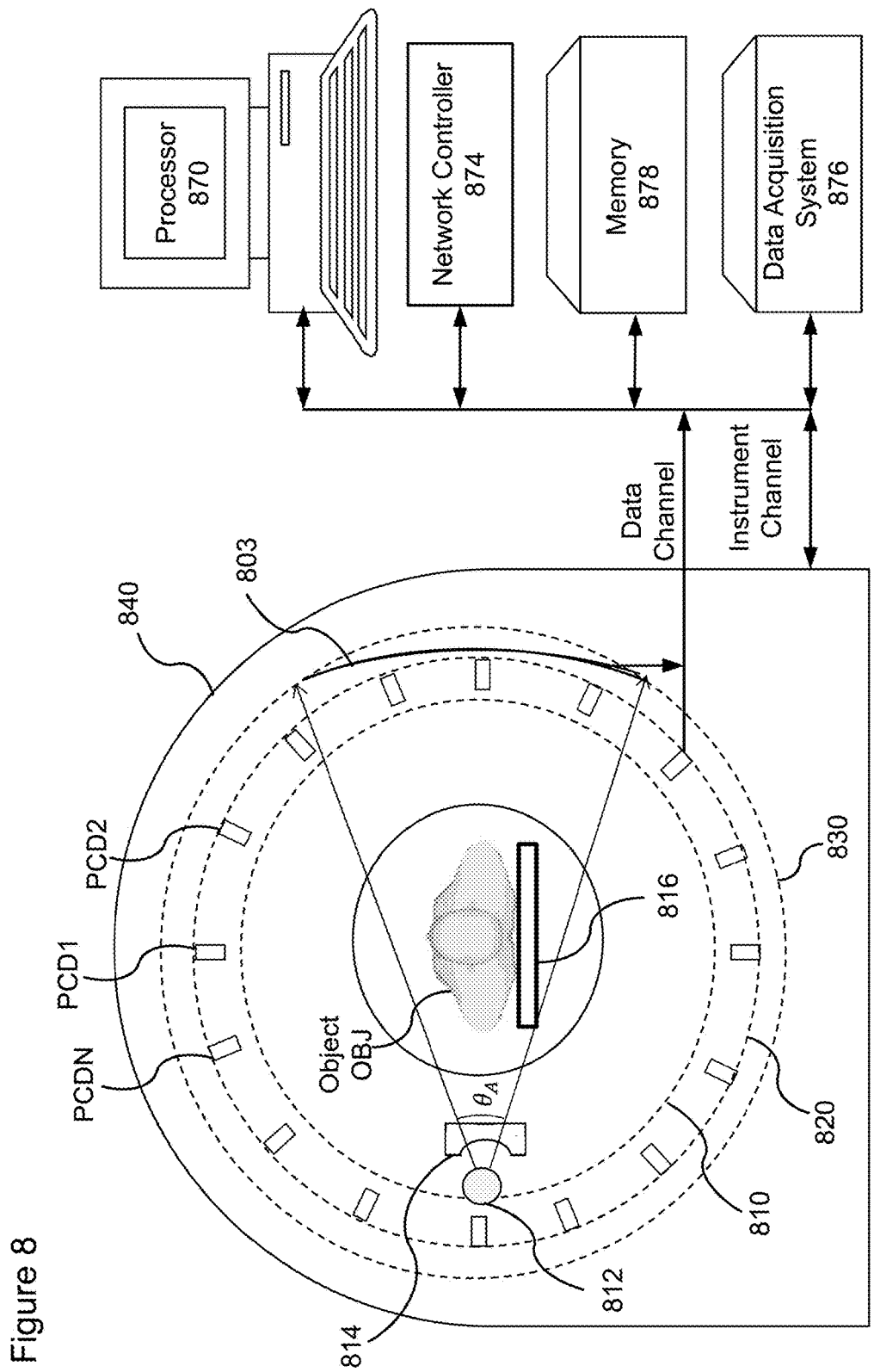
FIG. 8 shows an implementation of a computed tomography (CT) scanner.

FIG. 8 shows a schematic view of a CT scanner system with hybrid systems having energy-integrating detectors arranged in a third-generation geometry and photon-counting detectors (PCDs) arranged in a fourth-generation geometry. FIG. 8 shows a coupled-ring topology with the X-ray source 812 inside the ring of PCDs and the X-ray detector unit 803 outside the ring of PCDs, as discussed in U.S. patent application Ser. No. 13/426,903, incorporated herein by reference in its entirety.

Illustrated in FIG. 8 is a CT application using a gantry 100 that uses optical communication between the rotor 160 and the stator 150. In FIG. 8, photon-counting detectors (PCDs) are arranged in a predetermined fourth-generation geometry in fixed positions relative to the stators 150. A detector unit 803 is arranged in a predetermined third-generation geometry in the CT scanner system in fixed positions relative to the stator 160. The PCDs are fixed to an annular ring 820 that is stationary relative to the stator 150 and the gantry 100. The detector unit 803 is fixed to an annular ring 830 that rotate with the rotor 160 relative to the stator 150.

FIG. 8 shows an example of the relative positions among an object OBJ to be scanned resting on a table 816, an X-ray source 812, a collimator/filter 814, an X-ray detector 803, and photon-counting detectors PCD1 through PCDN. The PCDs have a front surface, oriented towards the object OBJ and a back surface oriented away from the object OBJ. X-rays traveling through the object OBJ are either detected by the PCDs (at the front surface) or pass through the spaces between the sparsely arranged PCDs and are detected by the tightly packed energy-integrating detectors in the X-ray detector 803.

Also shown in FIG. 8 is circuitry and hardware for acquiring, storing, processing, and distributing X-ray projection data. The circuitry and hardware include: a processor 870, a network controller 874, a memory 878, and a data acquisition system 876.

In one implementation, the X-ray source 812 and the collimator/filter 814 are fixedly connected to a rotational component 810 that is rotatably connected to a gantry 100. The X-ray detector 803 is similarly fixedly connected to a rotational component 830 that is rotatably connected to the gantry 100. While the PCDs are fixedly connected to a circular component 820 that is fixedly connected to the gantry 100. The gantry 100 houses many pieces of the CT scanner.

The gantry 100 of the CT scanner also includes an open aperture enabling the object OBJ that is arranged on a table 816 positioned in a projection plane of the X-rays traveling from the X-ray source to the PCDs and detector unit 803. The "projection plane" is a volume wherein X-rays pass from the X-ray source 812 to the detectors including the PCDs and the detector unit 803. The "object space" is the intersection of the projection plane and the open aperture 615 of the gantry. The "image space" includes the union of projection planes corresponding to all projection angles of the X-ray source 812 as the X-ray source 812 rotates around the aperture of the gantry. The image space is generally larger than the object space enabling image reconstruction for a volume extending beyond the aperture of the gantry and into the structure of the gantry 100.

A scan is performed when an object OBJ occupies the object space and the X-ray source is rotated through a series of projection angles with the CT scanner acquiring projection data of the X-ray transmission/attenuation through the object OBJ at each projection angle.

In general, the photon-counting detectors PCD1 through PCDN each output a photon count for each of a predetermined number of energy bins. In addition to the photon-counting detectors PCD1 through PCDN arranged in the fourth-generation geometry, the implementation shown in FIG. 8 includes a detector unit 803 having energy-integrating detectors arranged in a conventional third-generation geometry. The detector elements in the detector unit 803 can be more densely placed along the detector unit surface than the photon-counting detectors.

In one implementation, the photon-counting detectors are sparsely placed around the object OBJ in a predetermined geometry such as a circle. For example, the photon-counting detectors PCD1 through PCDN are fixedly placed on a predetermined second circular component 820 in a gantry.

Both the X-ray source 812, collimator 814 (e.g., a bow-tie filter), and the detector unit 803 rotate around the object OBJ while the photon-counting detectors PCD1 through PCDN are stationary with respect to the object OBJ. In one implementation, the X-ray source 812 projects X-ray radiation with a predetermined source fan beam angle $\theta_A$ towards the object OBJ while the X-ray source 812 rotates around the object OBJ outside the sparsely placed photon-counting detectors PCD1 through PCDN. Furthermore, the detector unit 803 is mounted at a diametrically opposed position from the X-ray source 812 across the object OBJ and rotates outside the stationary circular component 820, on which the photon-counting detectors PCD1 through PCDN are fixed in a predetermined sparse arrangement.

The CT scanner also includes a data channel that routes projection measurement results from the photon counting detectors and the detector unit 803 to a data acquisition system 876, a processor 870, memory 878, network controller 874. The data channel from the detector unit 803 can be performed by the optical communication between the rotor 160 and the stator 150, as described herein. The data acquisition system 876 controls the acquisition, digitization, and routing of projection data from the detectors. The data acquisition system 876 also includes radiography control circuitry to control the rotation of the annular rotating frames 810 and 830. In one implementation data acquisition system 876 will also control the movement of the bed 816, the operation of the X-ray source 812, and the operation of the X-ray detectors 803. The data acquisition system 876 can be a centralized system or alternatively it can be a distributed system. In an implementation, the data acquisition system 876 is integrated with the processor 870. The processor 870 performs functions including reconstructing images from the projection data, pre-reconstruction processing of the projection data, and post-reconstruction processing of the image data.

The processor 870 can include a CPU that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory may be non-volatile, such as ROM, EPROM, EEPROM or FLASH memory. The memory can also be volatile, such as static or dynamic RAM, and a processor, such as a microcontroller or microprocessor, may be provided to manage the electronic memory as well as the interaction between the FPGA or CPLD and the memory.

In one implementation, the data acquisition system 876 can be used to control the optical communication between the rotor and the stator. In another implementation, the processor 870 can be used to control the optical communication between the rotor and the stator.

Alternatively, the CPU in the reconstruction processor may execute a computer program including a set of computer-readable instructions that perform the functions of the optical communication system between the rotor and the stator as described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display. The display can be an LCD display, CRT display, plasma display, OLED, LED or any other display known in the art.

The memory 878 can be a hard disk drive, CD-ROM drive, DVD drive, FLASH drive, RAM, ROM or any other electronic storage known in the art.

The network controller 874, such as an Intel Ethernet PRO network interface card from Intel Corporation of America, can interface between the various parts of the CT scanner. Additionally, the network controller 874 can also interface with an external network. As can be appreciated, the external network can be a public network, such as the Internet, or a private network such as an LAN or WAN network, or any combination thereof and can also include PSTN or ISDN sub-networks. The external network can also be wired, such as an Ethernet network, or can be wireless such as a cellular network including EDGE, 3G and 4G wireless cellular systems. The wireless network can also be WiFi, Bluetooth, or any other wireless form of communication that is known.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. A mirror-ring apparatus, comprising:
   a stator;
   a rotor configured to rotate relative to the stator;
   a first downlink optical source arranged on the rotor and configured to provide a downlink beam radiating at a predefined downlink angle with respect to the rotor that is predominantly orthogonal to a radial direction from a center of rotation of the rotor, wherein the first downlink optical source encodes data packets on the downlink beam of the first downlink optical source;
   a second downlink optical source arranged on the rotor and configured to provide a second downlink beam radiating at a predefined second downlink angle with respect to the rotor that is predominantly orthogonal to the radial direction;
   a plurality of downlink receivers arranged on the stator and configured to receive light from the first downlink optical source and decode the data packets; and
   a plurality of stator mirrors arranged on the stator, wherein throughout each angle interval of a first plurality of angle intervals of a rotation angle of the rotor, a respective stator mirror of the plurality of stator mirrors is configured to reflect the downlink beam from the first downlink optical source to a corresponding receiver of the plurality of downlink receivers, and, throughout respective gaps between adjacent angle intervals of the first plurality of angle intervals, the downlink beam from the first downlink optical source is not reflected from any of the plurality of stator mirrors to any of the plurality of downlink optical receivers,
   throughout each angle interval of a second plurality of angle intervals of the rotation angle of the rotor, the second downlink beam reflects from a respective mirror of the plurality of stator mirrors to a corresponding receiver of the plurality of downlink optical receivers, and each gap between adjacent angle intervals of the first plurality of angle intervals is spanned by a respective angle interval of the second plurality of angle intervals.

2. The mirror-ring apparatus according to claim 1, further comprising:
   a plurality of uplink optical sources connected to the stator, wherein each optical source is configured to transmit an uplink beam directed at an angle predominantly orthogonal to the radial direction; and
   a first uplink optical detector arranged on the rotor and configured to receive the uplink optical beam of the corresponding uplink optical source when the rotation angle of the rotor is within the corresponding angle interval of the first plurality of angle intervals.

3. The mirror-ring apparatus according to claim 2, further comprising:
   a second uplink optical detector arranged on the rotor and configured to receive the uplink optical beam of the uplink optical source that corresponds to the rotation angle of the rotor, when the rotation angle of the rotor is within the corresponding angle interval of the second plurality of angle intervals.

4. The mirror-ring apparatus according to claim 2, wherein
   the first uplink optical detector is arranged on the rotor adjacent to the first downlink optical source; and
   each uplink optical source of the plurality of uplink optical sources is arranged on the stator adjacent to the corresponding downlink receiver of the plurality of downlink receivers.

5. The mirror-ring apparatus according to claim 2, wherein the uplink optical beam is a fan beam that is narrow in the direction orthogonal to a plane of rotation of the rotor and fans out in the plane of rotation of the rotor.

6. The mirror-ring apparatus according to claim 1, wherein
   each of the first plurality of angle intervals represents the rotation angles of the rotor for which the downlink beam of the first downlink optical source is reflected from a respective stator mirror of the plurality of stator mirrors and is received at a corresponding one of the plurality of downlink receivers, and a gap between adjacent angle intervals of the first plurality of angle intervals represents a transition of the downlink beam between adjacent stator mirrors; and
   each of the second plurality of angle intervals represents of the rotation angles of the rotor for which the downlink beam of the second downlink optical source is reflected from a respective stator mirror of the plurality of stator mirrors and is received at a corresponding one of the plurality of downlink receivers, and a gap between adjacent angle intervals of the second plurality of angle intervals represents a transition of the downlink beam between adjacent stator mirrors.

7. The mirror-ring apparatus according to claim 1, wherein the first downlink optical source is configured to transmit data equivalent to data transmitted by the second downlink optical source.

8. The mirror-ring apparatus according to claim 1, wherein
the first downlink optical source is configured to communicate data from the rotor to the stator by partitioning the data into the data packets, wherein
the data packets are each concatenated with a header including reassembly information, and error-correction data.

9. The mirror-ring apparatus according to claim 8, further comprising:
a rotary encoder configured to measure a rotor angle representing the rotation angle of the rotor, wherein
when the rotor angle measured by the rotary encoder indicates that the downlink beam of the first downlink optical source is transitioning between adjacent stator mirrors, the data packets are not communicated using the downlink beam of the first downlink optical source.

10. The mirror-ring apparatus according to claim 9, further comprising:
a non-transitory computer-readable memory configured to store the data packets, wherein the non-transitory computer readable memory buffers the data packets when the first downlink optical source is transitioning between adjacent stator mirrors.

11. The mirror-ring apparatus according to claim 8, wherein
the second downlink optical source communicates the data packets from the rotor to the stator when the first downlink optical source is transitioning between adjacent stator mirrors.

12. The mirror-ring apparatus according to claim 1, wherein a number of the plurality of stator mirrors is greater than four.

13. A computed tomography (CT) apparatus, comprising:
a stator;
a rotor configured to rotate relative to the stator;
a radiation source radiating radiation into an object space and configured to rotate with the rotor;
a plurality of detector elements configured to detect the radiation transmitted from the radiation source through the object space, wherein the plurality of detector elements are configured to generate projection data;
processing circuitry configured to partition the projection data into data packets;
a first downlink optical source arranged on the rotor and configured to provide a downlink beam radiating at a predefined downlink angle with respect to the rotor that is predominantly orthogonal to a radial direction from a center of rotation of the rotor, wherein the first downlink optical source encodes the data packets on the downlink beam of the first downlink optical source;
a second downlink optical source arranged on the rotor and configured to provide a second downlink beam radiating at a predefined second downlink angle with respect to the rotor that is predominantly orthogonal to the radial direction rotor, wherein the second downlink optical source encodes the data packets on the downlink beam of the second downlink optical source;
a plurality of downlink receivers arranged on the stator and configured to receive the downlink beam from the first downlink optical source and decode the data packets; and
a plurality of stator mirrors arranged on the stator, wherein
throughout each angle interval of a first plurality of angle intervals of a rotation angle of the rotor, a respective stator mirror of the plurality of stator mirrors is configured to reflect the downlink beam from the first downlink optical source to a corresponding receiver of the plurality of downlink receivers, and, throughout respective gaps between adjacent angle intervals of the first plurality of angle intervals, the downlink beam from the first downlink optical source is not reflected from any of the plurality of stator mirrors to any of the plurality of downlink optical receivers,
throughout each angle interval of a second plurality of angle intervals of the rotation angle of the rotor, the second downlink beam reflects from a respective mirror of the plurality of stator mirrors to a corresponding receiver of the plurality of downlink optical receivers, and
each gap between adjacent angle intervals of the first plurality of angle intervals is spanned by a respective angle interval of the second plurality of angle intervals.

14. The CT apparatus according to claim 13, further comprising:
a plurality of uplink optical sources connected to the stator, wherein each optical source is configured to transmit an uplink beam directed at an angle predominantly orthogonal to the radial direction; and
a first uplink optical detector arranged on the rotor and configured to receive the uplink optical beam of the corresponding uplink optical source when the rotation angle of the rotor is within the corresponding angle interval of the first plurality of angle intervals.

15. The CT apparatus according to claim 14, further comprising:
a second uplink optical detector arranged on the rotor and configured to receive the uplink optical beam of the uplink optical source that corresponds to the rotation angle of the rotor, when the rotation angle of the rotor is within a corresponding angle interval of the second plurality of angle intervals.

16. The CT apparatus according to claim 14, wherein the uplink optical beam is a fan beam that is narrow in the direction orthogonal to a plane of rotation of the rotor and fans out in the plane of rotation of the rotor.

17. The CT apparatus according to claim 13, wherein
each of the first plurality of angle intervals represents the rotation angles of the rotor for which the downlink beam of the first downlink optical source is reflected from a respective stator mirror of the plurality of stator mirrors and is received at a corresponding one of the plurality of downlink receivers, and a gap between adjacent angle intervals of the first plurality of angle intervals represents a transition of the downlink beam between adjacent stator mirrors; and
each of the second plurality of angle intervals represents of the rotation angles of the rotor for which the downlink beam of the second downlink optical source is reflected from a respective stator mirror of the plurality of stator mirrors and is received at a corresponding one of the plurality of downlink receivers, and a gap between adjacent angle intervals of the second plurality of angle intervals represents a transition of the downlink beam between adjacent stator mirrors.

18. The CT apparatus according to claim 13, wherein the first downlink optical source is configured to transmit data equivalent to data transmitted by the second downlink optical source.

19. A mirror-ring apparatus, comprising:
a stator;
a rotor configured to rotate relative to the stator;
a first downlink optical source arranged on the rotor and configured to provide a downlink beam radiating at a predefined downlink angle with respect to the rotor that is predominantly orthogonal to a radial direction from a center of rotation of the rotor, wherein the first downlink optical source encodes data packets on the downlink beam of the first downlink optical source;
a plurality of downlink receivers arranged on the stator and configured to receive light from the first downlink optical source and decode the data packets;
a plurality of stator mirrors arranged on the stator, wherein, throughout each angle interval of a first plurality of angle intervals of a rotation angle of the rotor, a respective stator mirror of the plurality of stator mirrors is configured to reflect the downlink beam from the first downlink optical source to a corresponding receiver of the plurality of downlink receivers, and, throughout respective gaps between adjacent angle intervals of the first plurality of angle intervals, the downlink beam from the first downlink optical source is not reflected from any of the plurality of stator mirrors to any of the plurality of downlink optical receivers; and
a plurality of groupings of downlink optical sources arranged on the rotor, wherein
the plurality of groupings of downlink optical sources includes the first downlink optical source,
each downlink optical source is configured to provide a respective downlink beam that radiates at an angle predominantly orthogonal to the corresponding radial direction,
each grouping of downlink optical sources includes at least two downlink optical sources,
each of the downlink optical sources of a grouping of the downlink optical sources is arranged to provide the downlink beam of the downlink optical sources to a respective downlink receiver not receiving another downlink beam, and is arranged to span each gap between adjacent angle intervals of the first plurality of angle intervals, and
each downlink optical source transitions between adjacent stator mirrors during a time when no other downlink optical source of the same grouping is transitioning between adjacent stator mirrors.

20. The mirror-ring apparatus according to claim 19, further comprising:
a plurality of groupings of uplink optical detectors that is arranged on the rotor, wherein
each uplink optical detector corresponds to a respective downlink optical source and transmits an uplink beam, and
each uplink optical detector receives the uplink beam of a corresponding uplink optical source when the corresponding downlink receiver receives the downlink beam of the corresponding downlink optical source.

* * * * *